Feb. 14, 1967  H. R. TKATCH  3,304,072
METAL SCRAP SMELTING APPARATUS
Filed June 1, 1964  2 Sheets-Sheet 1

INVENTOR.
Hershell R. Tkatch
BY
ATTORNEY

Feb. 14, 1967    H. R. TKATCH    3,304,072
METAL SCRAP SMELTING APPARATUS
Filed June 1, 1964    2 Sheets-Sheet 2
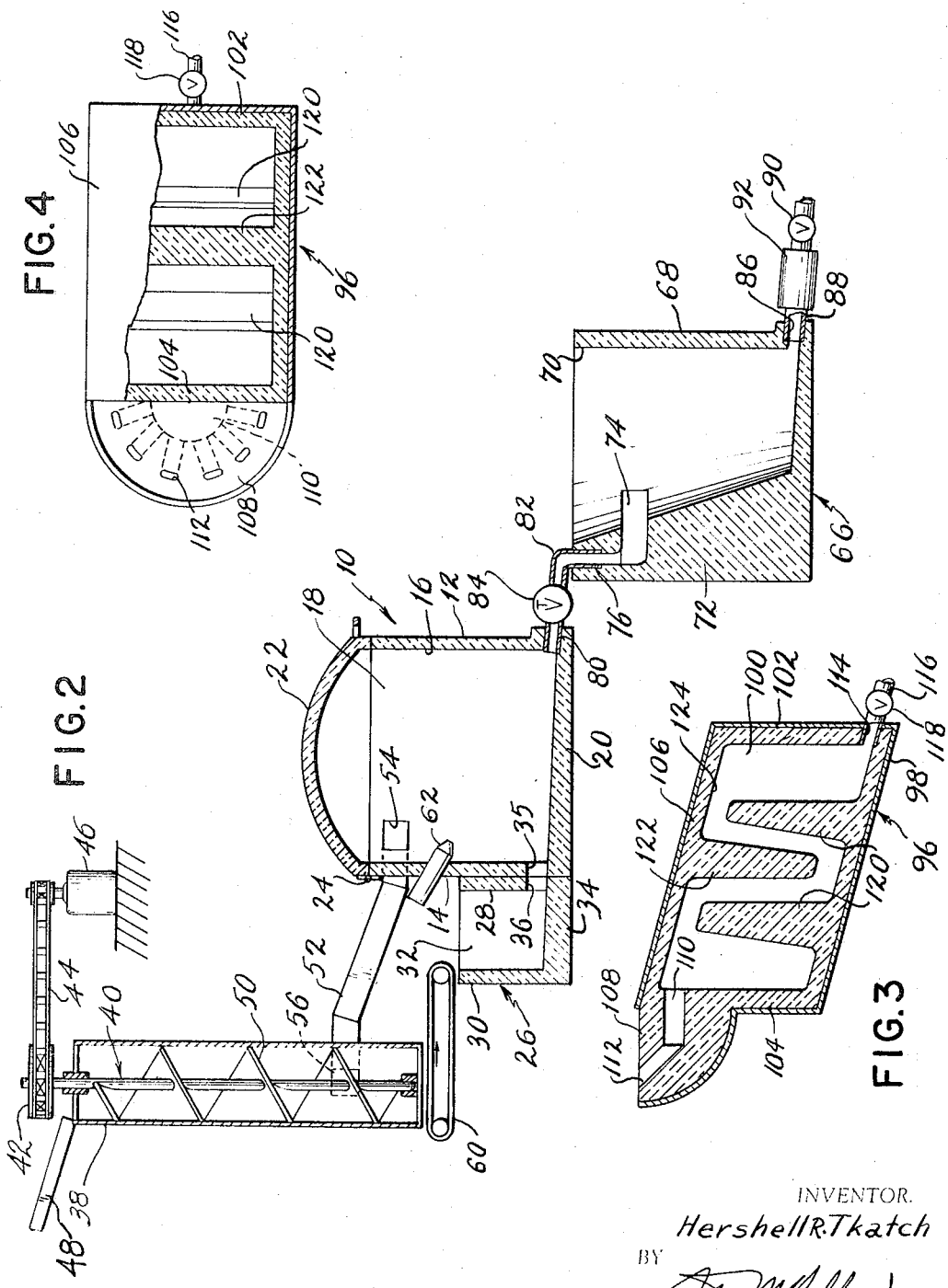
INVENTOR.
Hershell R. Tkatch
BY
ATTORNEY United States Patent Office 3,304,072
Patented Feb. 14, 1967

3,304,072
METAL SCRAP SMELTING APPARATUS
Hershell R. Tkatch, 7 Norfolk St.,
Hartford, Conn. 06112
Filed June 1, 1964, Ser. No. 371,442
8 Claims. (Cl. 266—13)

The present invention relates to a method and apparatus for melting scrap metals. More particularly, the present invention is directed to the devising of a method and apparatus for smelting scrap metals, on a continuous basis. More specifically, the present invention is directed to the devising of a method and the provision of apparatus for smelting, on a continuous basis, of scrap metals of different grades, in varying proportions, to obtain a homogeneous smelted mass of predetermined varying character, as desired.

It is an object of the present invention to provide smelting apparatus for the carrying out of the foregoing objects which are of relatively simple construction and capable of being readily, easily and accurately remotely controlled as by computer means.

It is another object of the present invention to provide apparatus, of the character described, which will produce a homogeneous smelted product of accurately controlled predetermined character.

It is also an object of the present invention to provide apparatus, of the character described, which is economical in the consumption of heating material.

It is still another object of the present invention to provide apparatus, of the character described, which may be operated and controlled with minimum use of labor.

It is a further object of the present invention to provide apparatus, of the character described, which may be constructed with a minimum of materials at relatively low cost.

It is a still further object of the present invention to provide apparatus, of the character described, which is readily accessible for rapid cleaning and repair to thereby provide economies in maintenance costs and minimize the idle time of the apparatus.

The foregoing and other objects and advantages of the smelting apparatus of the present invention will become more readily apparent to those skilled in the art from the embodiment thereof shown in the accompanying drawings, and from the description following. It is to be understood, however, that such embodiments are shown by way of illustration only, to make the principles and practice of the invention more readily comprehensible, and without any intent of limiting the invention to the specific details therein shown.

In the drawings:

FIG. 2 is a vertical section taken on line 2—2 of FIG. 1;

FIG. 3 is a vertical sectional view through a modified form of a mixing ladle for the smelting apparatus of the invention; and FIG. 4 is a top plan view of the mixing ladle of FIG. 3, partly in section, to show structural details.

Figure 1:
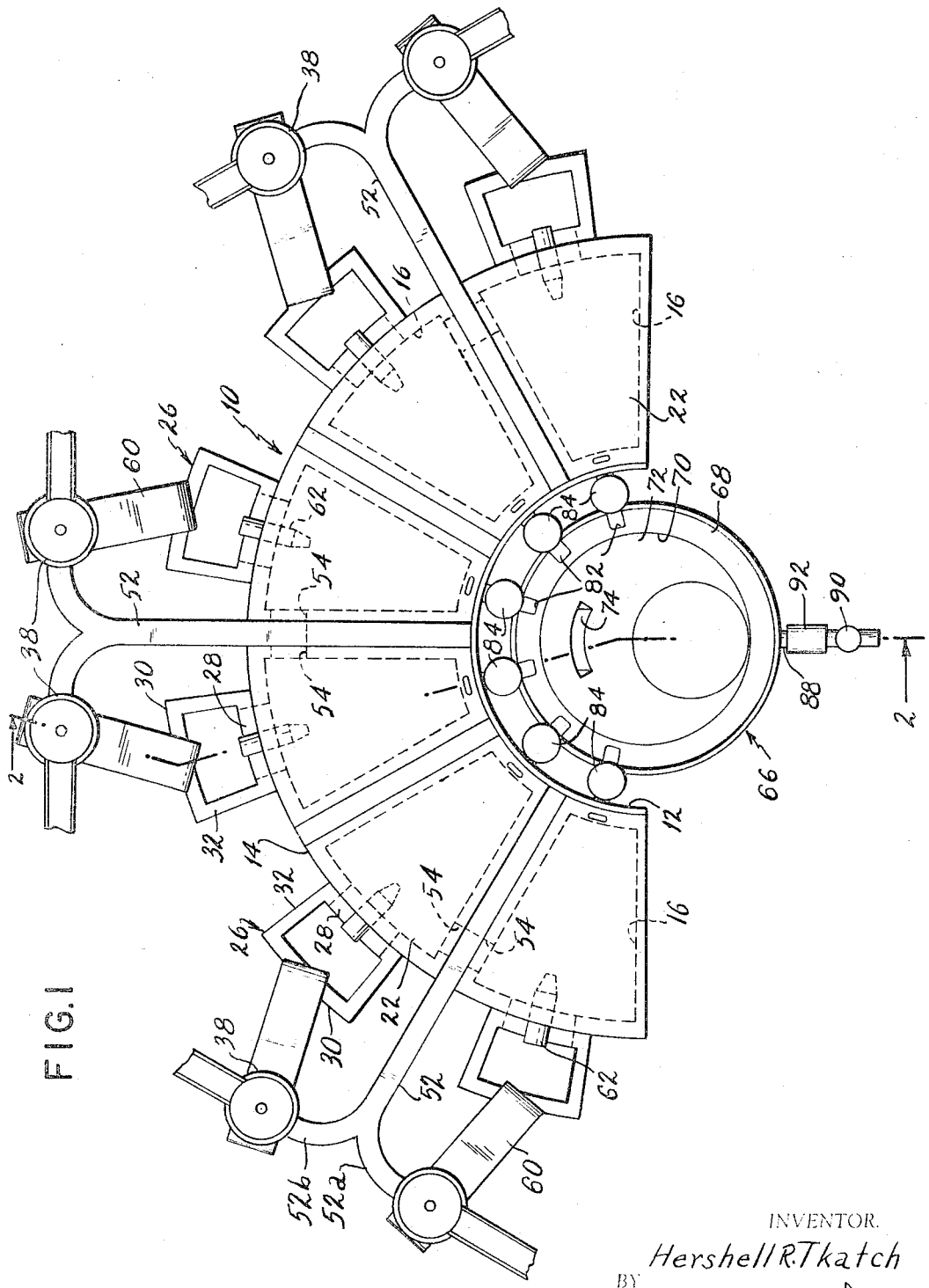
FIG. 1 is a more or less diagrammatic top plan view of a scrap metal smelting installation embodying the present invention.

In the accompanying drawing, one embodiment of a scrap smelting installation of the present invention, as particularly adapted for but not limited to the smelting of scrap aluminum, is more or less diagrammatically shown to comprise a furnace structure, generally designated as 10, which may comprise a semi-circular inner wall, 12, and a semi-circular outer wall, 14, concentric with the inner wall 12, and spaced therefrom. The furnace 10 may be subdivided into a plurality of individual and separated smelting chambers, 16, as by the spaced radially-extending partitions, 18. The furnace may also be provided with a bottom wall or floor, 20, which may slope slightly downwardly from the outer wall 14 toward the inner wall 12. The walls 12 and 14 of the furnace 10 and the partitions 18 may be formed of any refractory material conventionally used for the purpose, such as fire brick. The floor 20 may preferably be formed of a cast material. Each of the smelting chambers is preferably wholly enclosed by a preferably individual top wall which, for the purpose of ready access for cleaning and repair, may be in the form of a separable cover or lid 22 which may, if desired, be hinged on the outer wall 14, as at 24. Any desired number of smelting chambers 16 may be provided; the number in the illustrated embodiment is shown to be six.

Each of the furnace chambers 16 is provided with an associated open top feed box, generally designated as 26 on a level with, but preferably of lesser height than the furnace 10. Each feed box 26 comprises inner and outer walls, 28 and 30, respectively, side walls, 32, and a bottom wall or floor, 34. The feed box 26 is disposed with its inner wall 28 abutting the outer wall section 14 of its associated furnace chamber 16, with its floor 34 level with the floor 20 of the furnace 10, and with the inner floor surface preferably sloping downwardly from the outer wall 30 inwardly toward inner wall 28. The feed box 26 may likewise have its walls formed of the same refractory material as the furnace 10, and its floor of the same material as the floor of the furnace. The outer wall 14 of each smelting chamber 16 and the inner wall 28 of its associated feed box are provided with intercommunicating means at their bottoms, such as the respective registering openings, 35, and 36, which extend substantially the width of the respective walls.

Means are provided for automatically supplying an individual, different grade of scrap material to each of the feed boxes 26. Such means may comprise an open-ended, preferably cylindrical tower, 38, supported in any desired manner, which is not thought necessary to illustrate, with its bottom at a level slightly above the top of the rear wall 30 of the associated feed box 26. The tower 38 may have axially disposed therewithin a spiral feed, 40, whose center shaft may be journaled at its end in any suitable manner, to be driven from above the tower, as by the sprocket wheel, 42, mounted on the feed shaft, and the sprocket chain, 44, which is operatively connected to a driving motor, 46.

Each of the towers 38 may receive aluminum scrap, chopped up to desired size from an individual bin (not shown), which feeds into the tower from above, as by means of the chute, 48. The scrap is fed gradually downwardly into the tower by the spiral feed 40, whose spiral blade, 50, may preferably substantially fill the interior of the tower. The scrap is preheated as it moves gradually down on the blade 50 by the spent heated gasses from the associated smelting chamber 16; which gasses are conducted into the tower through a conduit, 52, which connects an opening, 54, in the upper portion of the partition wall of the smelting chamber, with an opening, 56, provided in the wall of the tower 38, adjacent its bottom.

It will be seen that the spiral blade 50, substantially filling the interior of the tower, will slow the passage of the heated gasses through the tower and afford such heated gasses sufficient time, in their ascent through the tower, for preheating the scrap descending on the blade 50.

Preferably, each conduit 52 may be arranged to serve to conduct spent heated gasses from an adjacent pair of furnace chambers to their respectively associated towers 38. This may be effected, as illustrated, by making the furnace end of the conduit 52 of rectangular cross-section and having registering openings in its opposed upright sides which connect with the openings 54 in the partition walls 18 defining the chambers 16. The other ends of the conduit 52 may be divided into two branches, 52a and 52b, respectively, each of which connects with an opening, 56, in one of the two adjacent towers 38.

While each tower 38 may be disposed directly above its associated feed box 26, it is preferable, for purposes of ease of access to the interior of the feed box, for whatever purpose may be required, as for cleaning, relining or other repair, to dispose each tower to one side, as outwardly, of the feed box and to discharge its preheated scrap to one end of the endless conveyor, 60, whose other end overhangs the opening of the feed box 26.

It will be apparent that the individual grade of preheated scrap fed into each feed box 26 will move along the inwardly sloping floor 34 thereof, through the openings 35 and 36 into its associated furnace chamber 16, were heat from any suitable source, as from burning fuel supplied through one or more jets, 62, set into an upper portion of the wall 18, will melt the scrap. The accumulated melted scrap at the bottom of the chamber 16 will back up into the associated feed box 26, to melt or further preheat the scrap fed thereinto. If desired, pumping or agitating means may be provided for each set of smelting chambers and feed box to assure the intermingling of all scrap with the molten metal, to maintain the melt at substantially uniform temperature.

The apparatus of the invention is also provided with a ladle structure into which the different grades of molten metal from the several smelting chambers 16 may be fed and automatically admixed into a homogeneous fluid mass.

In the embodiment of FIGS. 1 and 2, the ladle, generally designated as 66, may comprise a cylindrical body, 68, which may also be formed of a suitable refractory material, is disposed inwardly of the furnace 10, as in the arc formed by the inner wall 12, with its longitudinal axis uprightly disposed and with its upper edge slightly below the bottom of the furnace 10. The ladle 66 is provided with an interior, 70, preferably in the form of an inverted, eccentric, frusto-conical cavity whose outer wall portion, 72, adjacent wall 12 is thickened and tapers outwardly and upwardly. A horizontal mixing chamber, 74, is formed in the upper portion of the wall portion 72, opening into the ladle interior 70; the chamber 74 being connected by a plurality of vertical passages, 76, with the upper edge of the wall portion 72. Each smelting chamber 16 is provided with an outlet opening, 80, at the bottom of its inner wall section 72, which is connected by a conduit, 82, with the opening of a passageway, 76; the conduit 82 being provided with an adjustable flow valve, 84, for controlling the outflow of material from the chamber 16. The ladle 66 may be provided with an outlet opening, 86, at its bottom into which may be set the outlet conduit, 88, provided with an adjustable flow valve, 90. The outlet conduit 88 may be jacketed, as at 92, for heating, likewise in a manner that will be readily understood, and heating means may, if desired, also be provided for the ladle 66, to keep its contents fluid.

Preferably, the valves 84 and 90 may be of a type that is remotely controllable (many of which types of valves are readily available on the market), so that they may be readily, remotely, automatically controlled by computer means, in a manner that will be readily understood.

It will be apparent that, as the stream of molten metal from the several smelting chambers 16, in regulated predetermined quantities, are fed into the mixing chamber 74, the turbulence created when the streams strike one another as they flow in different directions within the chamber, will cause them to become intermingled into homogeneity; such intermingling being continued as the molten metal flows from the mixing chamber 74 on the sloping side of the ladle interior 70. It will also be apparent that the homogeneous fluid may be varied in its contents by varying the outflow from each of the smelting chambers 16 by the control of the outlet valve 84 of such chamber to adjust the amount of grade of metal from that chamber present in the final melt.

In FIGS. 3 and 4 a modified form of a mixing ladle is disclosed, which, in lieu of, or in addition to, provides mixing by turbulence; provides mixing by interrupted or irregular passage of the molten metal poured through the outlet from the ladle. Such mixing ladle of FIGS. 3 and 4 is shown to comprise a hollow body, of parallelogram shape, generally designated as 96, which includes a bottom wall, 98, side walls, 100, and end walls, 102 and 104; the end walls 102 and 104 being preferably upright and the bottom and top walls 98 and 106 sloping. The end wall 104, which is preferably disposed on a level higher than wall 102, is preferably formed with a relatively thick semi-circular lateral extension, 108, which is adapted to conform to the concavity of inner wall 12 of the smelting apparatus.

The wall extension, 108 is formed with a cavity, 110, opening into the interior of the ladle 96 and connected to the upper surface of the extension 108 by a plurality of passageways, 112, each of which may connect the cavity 110 to the outlet in one of the chambers 16, by suitable conduit and valve means, such as 82 and 84 respectively, in the same manner as with ladle 66. The outlet opening 114, is formed at the bottom of the side wall 102, into which the outlet conduit 116, controlled by an adjustable valve, 118, may be set, in a manner corresponding to the conduit 88 and the valve 90 of the ladle 66.

Interrupted passage of the fluid from the cavity 110 to the outlet 114 may be provided by two or more transverse upright vanes, 120, rising from the bottom wall 98 and terminating short of the top wall 106, and one or more dependent vanes, 122, extending from the top wall 106 between vanes 120 to provide a zig-zag path, 124, for the molten metal that will cause the fluid passing therethrough to mix. If desired the vanes may extend from the side walls, 100, in a manner that will be readily understood and not thought necessary to be here specifically illustrated.

It may be stated that the mixing ladle, either 66 or 96, may comprise fire brick or similar suitable refractory material surrounded by a metal shell, as illustrated in FIGS. 3 and 4.

This completes the description of the smelting apparatus of the present invention. It will be readily apparent that such apparatus is of relatively simple and compact construction. It will also be apparent that by reason of the compactness of the apparatus and the ultilization of the spent hot gasses for preheating the scrap fed into the apparatus, and by further reason of the short flow line for the molten metal, the apparatus of the present invention makes possible great economy in the use of fuel.

It will likewise be apparent that the apparatus of the present invention is easily accessible for cleaning and repair and, therefore, requires a minimum of labor time and a minimum of idle time for such purposes. It will additionally be apparent that the apparatus of the present invention is highly suitable for operation by remote control and by computer means.

It will be further apparent that numerous variations and modifications may be made in the apparatus of the present invention, by anyone skilled in the art, in accordance with the principles of the invention hereinabove set forth and without the exercise of any inventive ingenuity. I desire, therefore, the protection of the patent laws for any and all such variations and modifications that may be made within the spirit of the invention and the scope of the claims appended hereto.

What I claim is:

1. A furnace for smelting and fusing metal scrap of different grades into a homogeneous mass of controlled consistency comprising a plurality of open top smelting chambers each of quadrilateral shape having a bottom wall, a first end wall, a second end wall of greater width than said first end wall, and side walls connecting said end walls to form a chamber of tapered shape, said chambers juxtaposed with their narrow walls contiguously disposed to thereby form a concave recess at one end of said juxtaposed chambers, means associated with each of said smelting chambers for introducing fuel under pressure thereinto, an outlet opening formed at the bottom of the narrow wall of each of said chambers, a mixing ladle disposed below and opposite the concavity formed by said contiguously disposed narrow chamber walls, the upper end of said ladle being disposed below said outlet openings, said ladle including a thick wall portion in proximity to said narrow end walls, said thick ladle wall portion having a substantially horizontally disposed recess formed therein adjacent its upper end and opening into the interior of said ladle, said recess forming a mixing chamber, upwardly extending passageways formed in said wall portion connecting said mixing chamber with the exterior of said ladle, conduit means connecting the outlet openings of each of said smelting chambers with one of said passageways, an adjustable control valve provided in each of said conduit means, an outlet opening at the bottom of said ladle, and an adjustable control valve associated with said ladle outlet opening.

2. The smelting furnace of claim 1, wherein said ladle comprises a cylindrical body having a cavity of substantially inverted eccentric frusto-conical shape.

3. The smelting furnace of claim 1, wherein said mixing ladle comprises a closed chamber, said chamber having overlapping baffles extending thereinto from opposed sides thereof.

4. The smelting furnace of claim 1, wherein individual means are provided for feeding scrap into each of said smelting chambers and means are provided for preheating the scrap fed by said means into each said smelting chamber, said feeding means comprising an open-ended, upright cylindrical tower, a spiral feed disposed axially within said tower, and means rotating said spiral feed in the direction for moving material deposited at its upper end to the bottom thereof, and said preheating means comprising a cover on said smelting chamber and a hot air conduit connecting the upper end of said chamber with the lower end of said tower.

5. The smelting furnace of claim 4, wherein a feed box is disposed alongside the lower portion of the wider end wall of each of said smelting chambers, the bottom of said feed box being substantially on a level with the bottom of said chamber, and registering openings in said feed box and the bottom of said wider end wall interconnecting the interior of said feed box with said chamber, said feeding means arranged above the top of said feed box.

6. The smelting furnace of claim 5, wherein said tower is disposed to one side of said feed box and conveyor means are provided at the bottom of said tower for conveying the scrap therefrom into said feed box.

7. The smelting furnace of claim 1, wherein said narrower end walls of said smelting chambers are concave and are continuous with one another and form an arc.

8. The smelting furnace of claim 7, wherein said second end walls of said chambers are continuous with one another and form an arc concentric with said arc of said narrower end walls.

References Cited by the Examiner

UNITED STATES PATENTS 2,923,438   2/1960   Logan et al. _____ 141—104

JOHN F. CAMPBELL, *Primary Examiner.*

M. L. FAIGUS, *Assistant Examiner.*